United States Patent
Luu et al.

(10) Patent No.: US 12,246,687 B2
(45) Date of Patent: Mar. 11, 2025

(54) ELECTROMECHANICAL ACTUATOR FOR A VEHICLE BRAKE WITH INCREASED SERVICE LIFE

(71) Applicant: HITACHI ASTEMO FRANCE, Drancy (FR)

(72) Inventors: Gérard Luu, Noisy le Grand (FR); Christophe Dupas, Pornic (FR); Alberto Molinaro, Yokohama (JP); Cédric Guignon, La Queue en Brie (FR); Marc Ayache, Paris (FR)

(73) Assignee: HITACHI ASTEMO FRANCE, Drancy (FR)

( * ) Notice: Subject to any disclaimer, the term of this patent is extended or adjusted under 35 U.S.C. 154(b) by 452 days.

(21) Appl. No.: 17/596,150

(22) PCT Filed: Jun. 5, 2020

(86) PCT No.: PCT/FR2020/050961
§ 371 (c)(1),
(2) Date: Dec. 3, 2021

(87) PCT Pub. No.: WO2020/245548
PCT Pub. Date: Dec. 10, 2020

(65) Prior Publication Data
US 2022/0227346 A1    Jul. 21, 2022

(30) Foreign Application Priority Data
Jun. 7, 2019  (FR) ........................................ 1906067

(51) Int. Cl.
*B60T 13/74*  (2006.01)
*F16D 65/18*  (2006.01)
(Continued)

(52) U.S. Cl.
CPC ............. *B60T 13/741* (2013.01); *F16D 65/18* (2013.01); *F16D 2121/24* (2013.01); *F16D 2125/40* (2013.01)

(58) Field of Classification Search
CPC .. F16D 2121/24; F16D 2125/40; F16D 65/18; F16F 2066/003; F16F 2066/005; B60T 13/741; F16H 25/2015
See application file for complete search history.

(56) References Cited

U.S. PATENT DOCUMENTS 2,842,180 A * 7/1958 Brown ..................... F16B 39/30
411/285
2,934,182 A * 4/1960 Neville ................. F16B 35/041
403/408.1
(Continued)

FOREIGN PATENT DOCUMENTS

CN  107336699 A  11/2017
CN  110173519 A  8/2019
WO  2015082205 A2  6/2015

OTHER PUBLICATIONS

International Search Report for PCT/FR2020/050961 dated Oct. 12, 2020.
(Continued)

*Primary Examiner* — Bradley T King
(74) *Attorney, Agent, or Firm* — McDonald Hopkins LLC (57) ABSTRACT

An electromechanical actuator for a motor vehicle brake, comprising an electric motor absorbing a nominal rated current (In), a screw-and-nut movement converter including a screw with an axis (AX) extending in a longitudinal direction and a nut supported by the screw, and comprising at least one elastic return member for varying the resistance to forward motion in the longitudinal direction of an element being transferred between the nut and the screw at a predetermined position, in order to modify the nominal rating (In)
(Continued)

of the current flowing through the motor while the element is being transferred to the predetermined position.

10 Claims, 4 Drawing Sheets

(51) Int. Cl.
  *F16D 121/24* (2012.01)
  *F16D 125/40* (2012.01)

(56) References Cited

U.S. PATENT DOCUMENTS

| | | | | |
|---|---|---|---|---|
| 3,426,820 | A * | 2/1969 | Phipard, Jr. | B21H 3/025 |
| | | | | 411/938 |
| 3,986,302 | A * | 10/1976 | Biardi | B24B 45/00 |
| | | | | 451/342 |
| 4,379,693 | A * | 4/1983 | Wallshein | A61C 7/10 |
| | | | | 433/7 |
| 5,195,390 | A * | 3/1993 | Nogaki | E05F 15/622 |
| | | | | 49/362 |
| 6,394,235 | B1 | 5/2002 | Poertzgen et al. | |
| 2009/0283371 | A1 | 11/2009 | Winkler et al. | |
| 2016/0297410 | A1 * | 10/2016 | No | B60T 13/741 |
| 2016/0355169 | A1 * | 12/2016 | Ohlig | B60T 13/741 |
| 2017/0100650 | A1 * | 4/2017 | Anderle | A63B 69/0002 |
| 2017/0321773 | A1 | 11/2017 | Lee | |
| 2018/0118177 | A1 * | 5/2018 | No | H02P 7/03 |
| 2018/0126973 | A1 * | 5/2018 | Choe | F16D 55/226 |
| 2018/0345937 | A1 * | 12/2018 | Winkler | F16D 65/18 |
| 2019/0256072 | A1 * | 8/2019 | Hyeon | F16D 65/18 |
| 2019/0277355 | A1 * | 9/2019 | Kim | F16D 65/18 |
| 2020/0049215 | A1 * | 2/2020 | Song | F16D 65/18 |
| 2021/0354679 | A1 * | 11/2021 | Putz | B60T 17/221 |

OTHER PUBLICATIONS

Written Opinion for PCT/FR2020/050961 dated Oct. 12, 2020.
Search Report for French application No. FR1906067 dated Jan. 29, 2020.
Specification and drawings for U.S. Appl. No. 17/418,413, filed Jun. 25, 2021.
Specification and drawings for U.S. Appl. No. 17/417,661, filed Jun. 23, 2021.
First Office Action in corresponding Chinese Patent Application No. 202080048182.3, dated Mar. 28, 2024 (with English translation).

* cited by examiner

ELECTROMECHANICAL ACTUATOR FOR A VEHICLE BRAKE WITH INCREASED SERVICE LIFE

CROSS-REFERENCE TO RELATED APPLICATIONS

This is a National Stage of PCT international application PCT/FR2020/050961, filed on Jun. 5, 2020, which claims the priority of French Patent Application No. 1906067, filed Jun. 7, 2019, both of which are incorporated herein by reference in their entirety.

TECHNICAL FIELD

The invention is concerned with the field of automobile vehicle braking of the electromechanical type, and more precisely with an electromechanical actuator for a vehicle brake. The invention is also concerned with a drum brake, especially for a parking brake application, with an electromechanical actuator.

BACKGROUND OF THE INVENTION

In a vehicle brake of the electromechanical type, it is known to electrically activate the selective movement of a shoe carrying a friction lining. The movement of the shoe is controlled by an electromechanical actuator, between a braking position in which the friction lining is bearing against a rotating surface rotatably connected to the wheel of the vehicle equipped with the brake, and a rest position in which the friction lining extends away from the rotating surface.

This electromechanical actuator includes an electric motor, controlled by a calculator that regulates the electric current drawn by the motor, this motor rotatably driving a worm screw carrying a nut rotatably locked and free to translate along this screw, taking with it the movement of the shoe.

Between each braking/brake releasing cycle, it is desired to know the position of the nut at rest along the screw to ensure that the brake properly operates, without however leading to the addition of a position sensor and an associated chain for processing the data collected.

To this end, it is known to operate the motor, in the opposite mode to that provided during the braking step, until the nut is bearing against a stop provided at the distal end of the screw with respect to the rotating surface. The nut bearing against this stop constitutes a rest position known as a fully retracted position of the nut, and therefore of the shoe.

When this retracted position is reached, the resistance to progress of the nut increases abruptly, inducing a force rise in the force of the nut, which clamps against the stop, this clamping being reflected by a peak increase in the rated intensity of the current flowing through the motor. The calculator then detects an intensity value exceeding a predefined threshold value, corresponding to the indication that the nut is fully retracted, and causes the power supply to the motor to stop.

In practice, between the time instant when the nut comes in abutment and the time instant when the power supply is actually stopped, a certain period of time elapses, corresponding to the response time of the calculator. For the duration of this response time, the motor continues to rotatably drive the screw and clamp the nut against the stop. These repeated force rises of the nut against the stop throughout the operating life of the brake may damage the components of the actuator, and in particular induce premature ageing of the motor.

The purpose of the invention is to provide an electromechanical actuator for a vehicle brake for knowing the position of the nut along the screw without exposing its components to damage.

DISCLOSURE OF THE INVENTION

To this end, one object of the invention is an electromechanical actuator for an automobile vehicle brake comprising an electric motor drawing a current of rated intensity, and a screw-nut type motion converter including:
- a driving element among a screw with an axis extending along a longitudinal direction and a nut carried by the screw, the screw and the nut each comprising a thread for cooperating together, and
- a driven element corresponding to the other among the screw and the nut, the driving element being rotationally coupled to the electric motor and translationally fixed along the longitudinal direction, and the driven element being rotationally fixed and translationally free along the longitudinal direction, said driven element moving along the longitudinal direction in response to a rotation of the driving element,
- characterised in that it includes at least one means for varying the resistance to progress of the driven element at at least one predetermined position along the movement of the driven element along the longitudinal direction in order to cause a change in the rated intensity of the current flowing through the motor when the driven element passes the predetermined position.

With this solution, the position of the driven element can be known in that when passing through the predetermined position, it corresponds to a variation in the rated intensity of the current drawn by the electric motor, without leading to a particular damage to the components of the actuator and more particularly the electric motor.

Another object of the invention is an electromechanical actuator thus defined, wherein the change in the rated intensity of the current flowing through the motor when the driven element passes through the predetermined position is an intensity increase.

Another object of the invention is an electromechanical actuator thus defined, wherein the means for varying the resistance to progress of the driven element is a compressive elastic return member extending along a portion of the screw.

Another object of the invention is an electromechanical actuator thus defined, wherein the elastic return member is a spring, preferably a pre-stressed spring.

Another object of the invention is an electromechanical actuator thus defined, wherein the means for varying the resistance to progress of the driven element is a singularity formed on the screw.

Another object of the invention is an electromechanical actuator thus defined, wherein the singularity is a thread portion of the screw that is oversized.

Another object of the invention is an automobile vehicle brake comprising at least one brake shoe and an electromechanical actuator thus defined, the driven element of the electromechanical actuator being arranged to accompany the shoe in its movement between a braking position in which the shoe is bearing against a rotating surface to be braked, and a fully retracted position of the shoe.

Another object of the invention is a brake thus defined, wherein said means is arranged to cause the driven element to encounter the predetermined position before reaching its fully retracted position in the retraction direction of the shoe.

Another object of the invention is a brake thus defined, wherein the electromechanical actuator provides parking and/or emergency braking.

The invention also relates to a method for monitoring the position of the driven element of an electromechanical actuator thus defined, which method comprises the steps of:

establishing an intensity threshold value with respect to the variation in the rated intensity induced by the predefined resistance to progress of the driven element when biased upon by the progress variation means, this threshold value being defined to be reached by the rated intensity at the predetermined portion;

taking measurements of the rated intensity during the movement of the driven element along the longitudinal direction and comparing these measurements with the intensity threshold value.

The invention also relates to a method thus defined, also comprising the steps of:

stopping providing current to the electric motor if the rated intensity it draws reaches the threshold value, and evaluating the position of the driven element being stopped by considering the rotation of the driving element between the time instant when the rated intensity reaches the intensity threshold and the time instant when the motor stop is actual.

DETAILED DISCLOSURE OF PARTICULAR EMBODIMENTS

Figure 1:
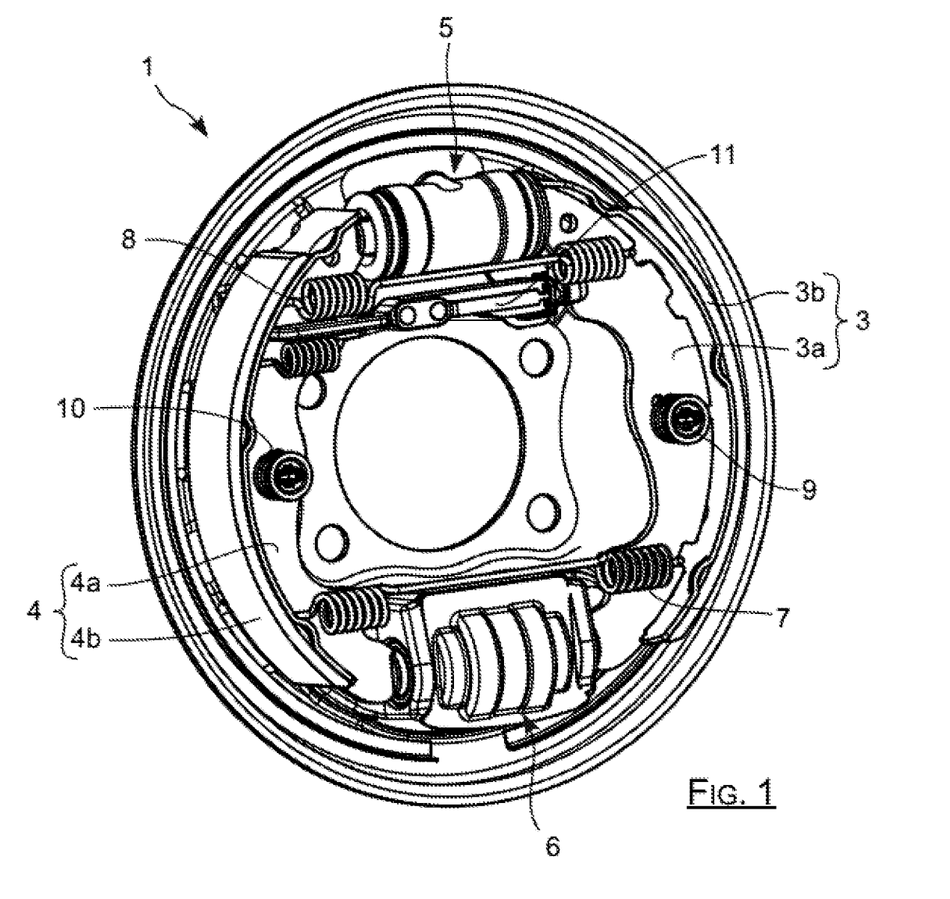
FIG. 1 is a perspective view of a drum brake according to the invention.

With reference to FIG. 1, there is represented a drum brake 1, comprising a revolution plate 2 equipped with a first and a second brake shoe 3 and 4 in the form of an arc of a circle and radially movable so as to be able to be pressed against the rotating face of a drum to be braked, not represented.

The shoes 3 and 4 each have a flat sheet metal core 3a, 4a in the form of a circular ring portion which carries a friction lining 3b, 4b, and are mounted diametrically opposite each other with their ends bearing against both a hydraulic wheel cylinder 5 and an electromechanical actuator 6 carried by the plate 2. These shoes 3 and 4 are also returned towards each other by two return springs 7 and 8, and each pressed against the plate 2 by a so-called side spring 9, 10.

A wear adjustment rod 11 extends along the wheel cylinder 5, having a first end bearing against the core 3a of the first shoe 3 and a second end bearing against the core 4a of the second shoe 4 when the brake is at rest.

The wheel cylinder 5, which is a hydraulic actuator, is to be actuated when the drum brake 1 is used according to a first so-called "simplex" operating mode, which ensures gradual braking particularly adapted to brake the vehicle in service. It comprises a cylindrical hydraulic chamber closed at its ends by two pistons which move apart when the hydraulic pressure increases and pushes the associated ends of the shoes 3 and 4.

The electromechanical actuator 6 in turn ensures parking braking by moving the associated ends of the shoes apart to ensure rapid and powerful locking of the vehicle wheels in a so-called "duo-servo" operating mode, as well as keeping them in the locked state, particularly when the wheel cylinder 5 is inactive. Further, the actuator 6 provides emergency braking.

Figure 2:
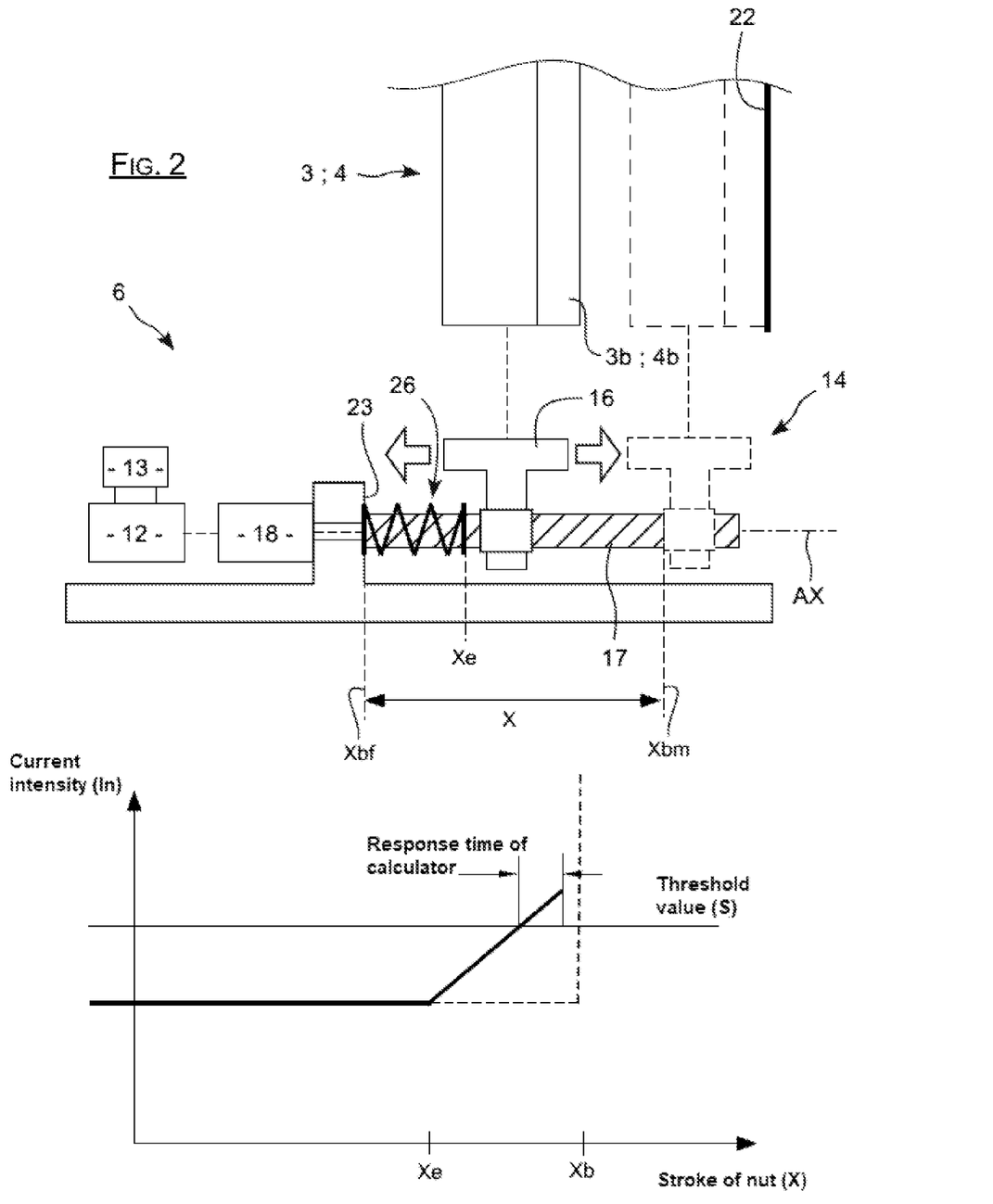
FIG. 2 represents an electromechanical actuator according to a first embodiment of the invention, comprising a nut moving longitudinally and a spring opposing its movement, as well as a graph associated with this architecture which simulates a rated intensity response as a function of the progress of the nut.

As is visible in FIG. 2, the electromechanical actuator 6 according to the invention comprises an electric motor 12, a calculator 13, and a screw-nut type motion converter 14. The calculator 13 drives the electric current delivered to the motor 12 during its activation. Placed at the terminals of the motor 12, this calculator 13 is able to detect fluctuations in the rated intensity In of the electric current drawn by the motor, and to interrupt providing this current to stop the motor.

The motion converter 14 comprises a nut 16 and a screw 17 rotatably driven by the motor 12, directly or indirectly via a motor reducer 18 ensuring a reduction in the speed of rotation measured at the motor output. The screw 17, with axis AX of longitudinal direction, comprises a male thread which cooperates with a female thread of the nut 16, this nut being carried by the screw. In particular, the screw 17 is translationally fixed while the nut is rotatably locked and free to translate along the screw.

The nut 16 is intended to accompany one of the shoes 3 and 4 in the brake 1 equipped with such an electromechanical actuator 6 in its movement, in order to selectively apply it against the rotating drum surface marked by 22, and to move it apart from this rotating surface 22.

More precisely, the stroke of the nut 16, marked by X, is bounded between a fixed portion of the actuator 6 forming a fixed stop 23, representing the fully retracted position of the nut, denoted as Xbf, and a so-called movable stop representing the braking position, denoted as Xbm and shown in dotted line, that is for which the friction lining 3b or 4b is in contact with the rotating surface 22. The fixed stop 23 is located as an extension of the distal end of the screw 17 relative to the rotating surface 22. The position of the movable stop is in turn determined by the thickness of the friction lining 3b, which wears down with each braking/brake releasing cycle, thus gradually moving this movable stop apart from the fixed stop 23, towards the rotating surface 22.

The idea underlying the invention is to equip the electromechanical actuator 6 with a means changing the resistance to progress of the nut at at least one predetermined position, located at a distance from the stops, in order to change the intensity of the current flowing through the motor when the nut passes through this predetermined position.

According to a first embodiment of the invention, the electromechanical actuator 6 comprises a spring, for example, a coil spring 26 extending over a portion of the screw 17 from a first end of the spring attached to the fixed stop 23, to a second end extending at a distance from the fixed stop 23, as is visible in FIG. 2. With this solution, when the nut 16, in translation towards the fixed stop 23, comes to bear against the second end of the spring, the spring is sandwiched between the fixed stop and the nut, exerting a force opposing the progress of this nut.

With this arrangement, the intensity In measured is generally constant until the nut 16 contacts the second end of the spring, this level of progress of the nut being denoted as Xe. As the nut continues to move towards the fixed stop 23, there is an increase in the current In drawn by the motor 12 to counteract the resistance to progress of the nut.

In the example of FIG. 2, this increase in intensity follows a ramp, in other words a linear increase, but it is understood that the invention is not limited to this feature, given that the time course of the intensity curve is a function of the nature of the spring, namely according to its spring constant and morphology.

It is understood here that the invention provides for the setting of an intensity threshold value, denoted as S, for which the calculator 13 causes stop of the power supply, taking into consideration the nature of the spring and the response time of the calculator so that the actual stopping of the nut is carried out before the nut is completely compressed, in other words, before it reaches its full length. This is because the fully compressed spring 26 would act in the same way as the fixed stop 23 and would cause the nut to be clamped against it.

Since the pitch of the screw, the spring constant of the spring 26 which induces a predetermined change in the intensity, and the response time of the calculator 13 are known data for a given application, the position of the nut being stopped can thus be determined in relation to the number of revolutions made by the screw since the increase in intensity In of the current. With this arrangement, the actuator 6 according to the invention thus makes it possible to know the position of the nut along the screw, while at the same time preventing the nut from being clamped against the fixed stop 23, which would lead to an intensity peak, visible as a dotted line in FIG. 2, and to damage.

An alternative in which the spring 26 is attached to the nut 16 at its first end and contacts the fixed stop 23 at the progress level Xe, or an alternative arrangement in which the spring is floatingly mounted to the screw 17, can be adopted without departing from the scope of the invention. With a floating arrangement, the spring 26 is free to move between the nut 16 and the fixed stop 23 until the nut reaches the progress level Xe in its movement towards the fixed stop, in other words when the distance measured between the fixed stop and the nut corresponds to the length of the spring, marking the contact of the spring against both the fixed stop and the nut.

Also, the invention advantageously provides for pre-stressing the spring 26 so as to provide a greater resistance to progress of the nut. Such an arrangement makes it possible to tend towards a more rapid increase in current intensity and consequently to favour a more rapid stop of the nut, the intensity reaching the threshold value S for a lesser movement of the nut in comparison with the use of a non-prestressed spring.

Figure 3:
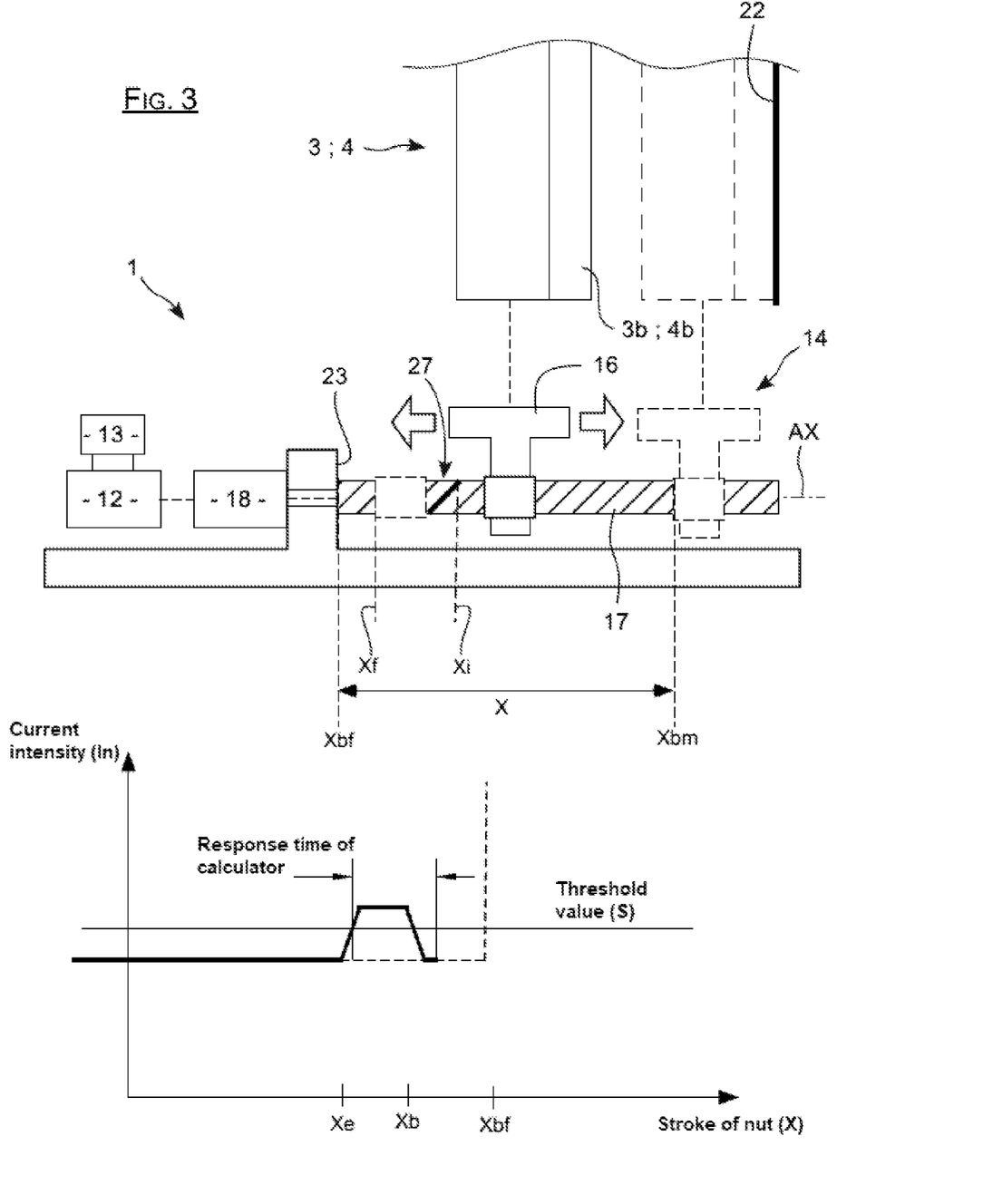
FIG. 3 represents an electromechanical actuator according to a second embodiment of the invention, comprising a nut moving longitudinally and an irregularly threaded screw opposing the movement of the nut, as well as a graph associated with this architecture which simulates a rated intensity response as a function of the progress of the nut.

According to a second embodiment, the change in the resistance to progress of the nut is achieved by means of an irregular thread of the screw.

In the example of FIG. 3, using the same electromechanical actuator architecture as FIG. 2 except for the spring 26, the screw 17 comprises a thread, a portion of which marked 27 is oversized. This oversized portion 27, bounded between two ends located at a distance from the movable and fixed stops, increases the local friction between the screw 17 and the nut 16 when the latter moves at the screw, and consequently increases the resistance to progress of the nut. The rated intensity In changes in the form of a square wave as the nut 16 passes through the oversized portion 27. More precisely, the intensity In successively increases in the form of a ramp from a level of progress of the nut denoted as Xi, corresponding to its engagement in the oversized portion 27. This increase is gradual in that the further the nut progresses along this portion 27, the greater the friction, given that the nut meshes more with it. In a non-limiting manner, when the length of the oversized portion 27 along the longitudinal direction is greater than that of the nut, it follows that from a given progress, the nut completely meshes with this portion. At this point, the rated intensity In follows a constant change until the nut starts its disengagement from the oversized portion 27, leading to a decrease in the form of a ramp of the rated intensity In. Once the nut is fully disengaged from this thread portion 27, at a point of progress denoted as Xf, the current displays a constant value, corresponding to the value measured before the nut passed over this portion 27.

In this embodiment, it is understood that the intensity threshold value S for which the calculator 13 causes the stop of the power supply is defined so as to have a value lower than that measured when the nut 16 evolves at the level of the oversized portion 27, that is to say so that the calculator detects an overshoot. As in the first embodiment, the position of the nut 16 being stopped, at a distance from the fixed and movable stops, can be determined in relation to the number of revolutions made by the screw since the increase in the current intensity In.

In the example of FIGS. 2 and 3, the screw 17 is a driving element while the nut 16 is a driven element, with a rotational movement of the screw being transformed into a translational movement for the nut, but the addition of a spring 26 or the formation of an oversized portion 27 on the screw thread are solutions that can also be applied for a reverse arrangement. In other words, these solutions are applicable in the case where the nut 16 is the driving element and the screw 17 is the driven element. With this arrangement, illustrated in FIGS. 4 and 5, a rotational movement of the nut 16, rotatably driven by the electric motor 12, is transformed into a translational movement of the screw 17 in order to directly move the shoe 3 provided at the end of the screw. It is understood that an arrangement in which the screw 17 indirectly pushes the shoe by means of a part interposed between this shoe and the screw end facing the shoe, does not depart from the scope of the invention.

Figure 4:
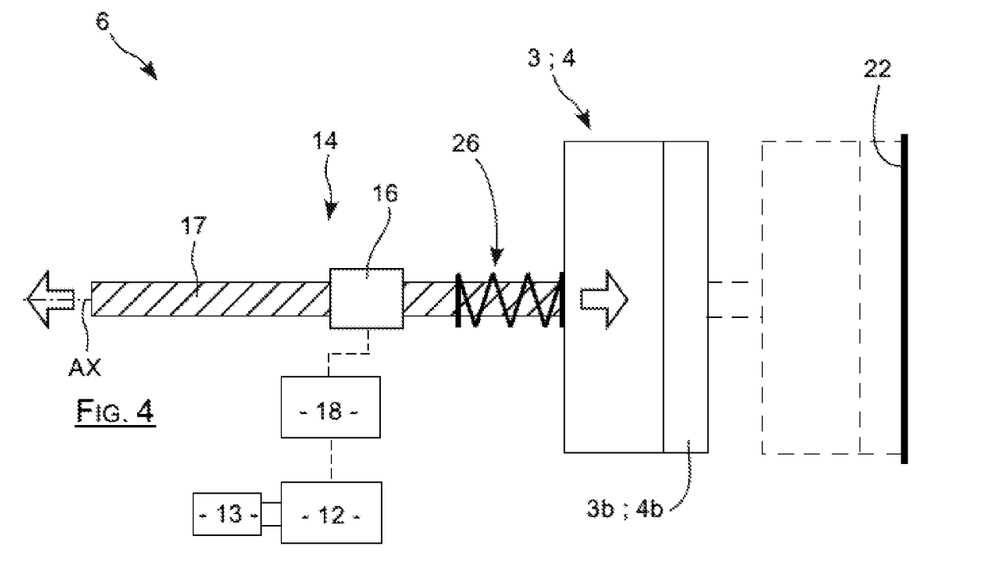
FIG. 4 represents an electromechanical actuator according to a third embodiment of the invention, comprising a screw moving longitudinally and a spring opposing its movement.

Thus, in a third embodiment of the electromechanical actuator, visible in FIG. 4, which uses the same components as in the case of the first mode but modulated differently, the spring 26 extends along a portion of the screw 17 by being attached to it at the end against which the shoe is held under the action of the return springs 7 and 8. The nut 16 forms a fixed stop on which the spring 26 bears when the screw 17 moves away from the rotating surface 22, that is along the retraction direction of the shoe. In this respect, it is understood that the rated intensity in the case of this third embodiment changes in the same way as in the case of the first embodiment. The intensity increases as the screw end fixedly carrying the spring approaches the nut once the spring bears against this nut. In the same way as in the first embodiment, this increase in intensity In, in response to the increase in the resistance to progress of the screw 17 under the effect of the elastic return of the spring 26, is detected by the calculator 13 above a threshold value S.

In an alternative embodiment, and in the same way as for the first embodiment, the invention provides for the spring 26 to be attached to the nut 16, at its first end, or else for it to be floatingly mounted to the screw 17 between the nut 16 and the shoe 3 or 4, which is held bearing against the screw 17 under the effect of the return springs.

Figure 5:
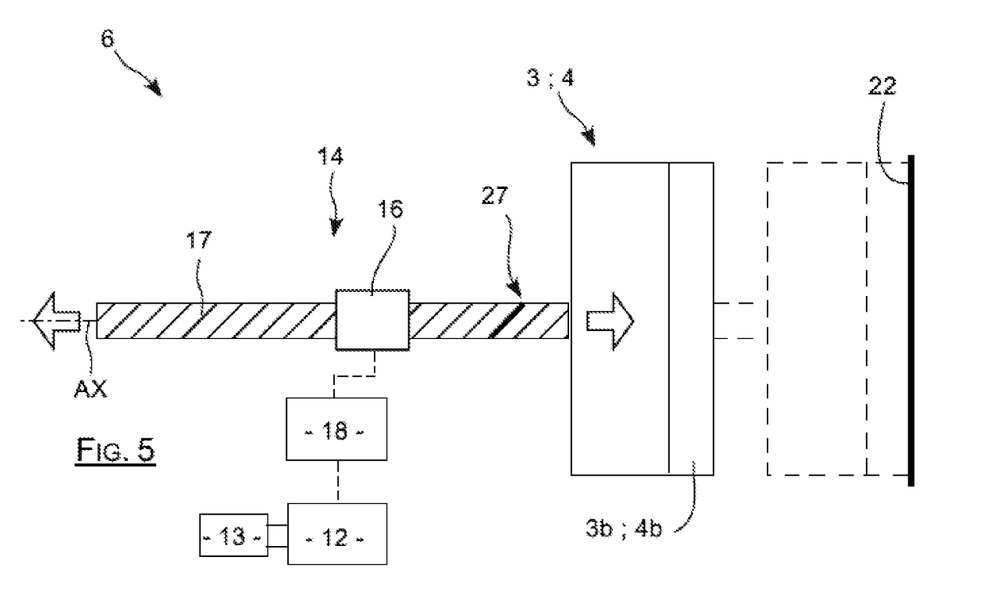
FIG. 5 represents an electromechanical actuator according to a fourth embodiment of the invention, comprising a screw moving longitudinally and an irregular thread opposing its movement.

Finally, according to a fourth embodiment, visible in FIG. 5, which uses the same components as in the case of the second embodiment but modulated differently, the screw 17 comprises an oversized thread portion 27 inducing in the same way an increase in the resistance to progress of the screw 17 when it passes through the nut 16. This increase in force is reflected in an increase in intensity In corresponding to that illustrated in the case of the second embodiment.

The invention has been described for a particular location of the spring 26 or the oversized portion 27, so as to lead to a change in the rated intensity (In) of the current passing through the motor in the retraction direction of the shoe 3 or 4. With this arrangement, the position of the driven element can be determined and the stop of the power supply can also be ordered before the shoe reaches its fully retracted position. As a result, the service life of the actuator is increased.

It is understood that the invention is not limited to this purpose, as the location of the spring 26 or the oversized portion 27 may vary as required. In other words, these elements may be placed so that the change in intensity resulting from their bias against the movement of the driven element indicates a particular position other than that indicating proximity to the fully retracted position.

By way of example, their placement may be defined such that the variation in induced rated intensity In is indicative that the friction lining 3b or 4b of the shoe is almost completely consumed, prompting the user of the vehicle equipped with such an actuator to change the shoe. In the case of an architecture according to the first embodiment, such a result is obtained by placing the spring along the screw 17 between the nut 16 and the shoe.

In particular, the electromechanical actuator may in particular comprise a plurality of springs or have an irregular screw thread at different locations, so as to mean several particular positions.

Within the scope of the first and third embodiments, the invention has been explained for the case where the resistance to progress of the driven element is provided by the elastic return of a coil spring. However, any other form of spring or any other member ensuring compressive elastic return is also contemplatable as long as it is attached or bounded in its movement so as to exert a force opposing the progress of the driven element at a predetermined position. As an example, the coil spring 26 could be replaced by a leaf, one end of which is attached to a fixed portion of the actuator 6 and one end of which is located on the stroke of the driven element to achieve resistance to progress by elastic deformation. Also, the use of spring washers, also known as Belleville washers, cascaded to form a spring with significant spring constant, is an efficient substitute for the use of a conventional pre-stressed spring.

Within the scope of the second and fourth embodiments, the invention has been explained by the formation of an oversized portion 27, that is formed with an oversize, however it is understood that the portion may be formed by a thin layer deposition of a material on the thread or may be limited to a point-like protrusion protruding from the screw 17. Also, the invention could conversely provide for an undersized or recessed portion of the thread so as to cause a drop in intensity In. It is understood that in this alternative, the threshold value S is defined as a minimum value below which the calculator 13 is prompted to stop power supply. Specifically, the electromechanical actuator according to the second embodiment or the fourth embodiment has a singularity at the screw thread to induce a variation in the rated intensity In of the current drawn by the electric motor 12.

Generally speaking, the electromechanical actuator 6 according to the invention comprises at least one means for varying, that is increasing or decreasing, the resistance to progress at a predetermined position of a driven element with respect to a driving element converting a rotational movement into a translational movement advantageously selected from a nut and a screw meshed together. This variation in resistance to progress induces an event on the curve of rated intensity In, measurable by means of a calculator or any other similar device, and thus makes it possible to evaluate the position of the driven element.

The electromechanical actuator 6 has been explained for the case where it equips a drum brake having shoes, but an application for a disc brake, with the driving element moving a brake pad relative to a brake disc, may be adopted without departing from the scope of the invention. Generally speaking, the electromechanical actuator 6 according to the invention allows a block, designating a shoe or a pad, to be selectively moved against a rotating surface to be braked.

NOMENCLATURE 1 drum brake
2 plate
3, 4 brake shoe
3a, 4a core
3b, 4b friction lining
5 wheel cylinder
6 electromechanical actuator
7, 8 return spring
9, 10 side spring
11 wear adjustment rod
12 electric motor
13 calculator
14 motion converter
16 nut
17 screw
18 motor reducer
22 rotating drum surface
23 fixed stop
26 spring
27 oversized thread portion
AX axis of the screw along a longitudinal direction
S intensity threshold
X stroke of the nut
Xbf, Xbm, Xe, Xi, Xf particular positions of the nut

What is claimed is:

1. An electromechanical actuator for an automobile vehicle brake comprising an electric motor drawing a current of rated intensity, and a screw-nut motion converter including:
   a driving element among a screw with an axis extending along a longitudinal direction and a nut carried by the screw, the screw and the nut each comprising a thread for cooperating together, and
   a driven element corresponding to the other among the screw and the nut, wherein the driving element is rotationally coupled to the electric motor and translationally fixed along the longitudinal direction, and wherein the driven element is rotationally fixed and translationally free along the longitudinal direction, wherein the driven element is configured to move in the longitudinal direction in response to a rotation of the driving element, between a fixed stop corresponding to a fully retracted position of the driven element and a movable stop representing a braking position of the driven element, wherein at least one singularity is formed on the screw, at a predetermined position along the movement of the driven element along the longitudinal direction, said singularity forming a means for varying the resistance to progress of the driven element to cause a change in the rated intensity of the current flowing through the motor upon when the driven element passes through said predetermined position, and wherein the singularity is an excess thickness or recessed portion of the thread of the screw bounded between two ends located at a distance from the movable and fixed stops.

2. The electromechanical actuator according to claim 1, wherein the electromechanical actuator is configured to measure or compare the change in the rated intensity of the current flowing through the motor upon when the driven element passes through said predetermined position and interrupt the current flowing through the motor based on the measure or comparison of the change in the rated intensity.

3. The electromechanical actuator according to claim 1, wherein the change in rated intensity of the current passing through the motor is an intensity increase.

4. The electromechanical actuator according to claim 1, wherein the singularity is a thread portion of the screw that is oversized.

5. An automobile vehicle brake comprising at least one brake shoe and an electromechanical actuator according to claim 1, wherein the driven element of the electromechanical actuator is provided to accompany the shoe in its movement between a braking position in which the shoe is bearing against a rotating surface to be braked, and a fully retracted position of the shoe.

6. The brake according to claim 5, wherein the driven element encounters the predetermined position before reaching its fully retracted position in the retraction direction of the shoe.

7. The brake according to claim 5, wherein the electromechanical actuator is configured to provide parking and/or emergency braking.

8. The brake according to claim 7, further comprising a hydraulic actuator which is configured to cooperate with said at least one brake shoe to provide service braking.

9. A method for monitoring the position of the driven element of the electromechanical actuator according to claim 1, the method comprising the steps of:

establishing an intensity threshold value with respect to the variation in the rated intensity induced when the driven element passes through the predetermined position, taking measurements of the rated intensity during the movement of the driven element along the longitudinal direction and comparing these measurements with the intensity threshold value.

10. The method according to claim 9, further comprising the steps of:

stopping providing current to the electric motor if the rated intensity it draws reaches the threshold value, and evaluating the position of the driven element being stopped by considering the rotation of the driving element between the time instant when the rated intensity reaches the intensity threshold and the time instant when the motor stop is actual.

* * * * *